United States Patent
King

[11] Patent Number: 5,995,000
[45] Date of Patent: Nov. 30, 1999

[54] WIRELESS COMPASS FOR VEHICLES

[75] Inventor: Joseph David King, Ann Arbor, Mich.

[73] Assignee: Lear Corporation, Southfield, Mich.

[21] Appl. No.: 09/093,761

[22] Filed: Jun. 9, 1998

[51] Int. Cl.[6] .................................................. B60Q 1/00
[52] U.S. Cl. ......................... 340/438; 340/457; 340/461
[58] Field of Search .................................... 340/438, 457, 340/459, 461, 462

[56] References Cited

U.S. PATENT DOCUMENTS

| | | | |
|---|---|---|---|
| 4,671,111 | 6/1987 | Lemelson | 340/438 |
| 5,525,977 | 6/1996 | Suman | 340/825.25 |
| 5,654,686 | 8/1997 | Geschke et al. | 340/426 |
| 5,708,410 | 1/1998 | Blank et al. | 340/438 |

OTHER PUBLICATIONS

"Chrysler Volunteers to Avoid Traffic" by Advanced transportation Technology News, V. 1 No. 6, Oct. 1, 1994.

*Primary Examiner*—Daniel J. Wu
*Attorney, Agent, or Firm*—Niro, Scavone, Haller & Niro

[57] ABSTRACT

A wireless compass for vehicles includes a compass sensor installed in a first location of a vehicle. The compass sensor sends information regarding the heading of the vehicle via a wireless transmitter. A compass display includes a complementary wireless receiver which receives the data from the compass sensor. The compass display and receiver are located at a second location convenient for the driver. The display displays the heading of the vehicle based upon the data received from the compass sensor.

14 Claims, 1 Drawing Sheet

WIRELESS COMPASS FOR VEHICLES

BACKGROUND OF THE INVENTION

The present invention relates to compasses for vehicles.

Many current automotive vehicles include compasses, together with a display indicating to the driver a current geographic heading. Other types of vehicles, such as aircraft, balloons, ships, missiles and snowmobiles, also include compasses. Several types of compass sensors have been successfully employed, including fluxgate, suspended magnetized needle, and magnetometer technologies.

Generally, the primary challenge in successfully implementing a compass with the desired accuracy is the external magnetic anomalies generated by the vehicle itself. These magnetic anomalies are typically created by such things as the surrounding metal of the vehicle itself, active electronics, electrical motors and the vehicle power plant.

SUMMARY OF THE INVENTION

The present invention addresses the challenge of the magnetic anomalies in a vehicle by installing the compass sensor and compass display in different locations in the vehicle, connected by a wireless link. The compass sensor is placed within an area of relatively low magnetic influence, while the compass display is installed in a location convenient for the driver. For ease of installation and reliable operation, the data from the compass sensor is sent to the compass display via a wireless link.

With any vehicle, some areas of the vehicle have substantially less magnetic influences, both in terms of quantity and magnitude. A compass sensor placed within these areas of relatively low magnetic influence due to vehicle and/or peripheral equipment is more easily compensated for the effects of the magnetic influences. However, since the most anomaly-free areas in vehicles tend to be at the rear of the vehicle (i.e., the tail section of an aircraft or the rear deck of an automobile) and the display must be placed toward the front of the vehicle so that it can be seen by the driver, the present invention utilizes a wireless link to send data from the compass sensor to the compass display. As a result, the compass sensor can be easily installed at the location which will provide the most accuracy, while the compass display can easily be installed at the most convenient location for the driver.

BRIEF DESCRIPTION OF THE DRAWINGS

The above, as well as other advantages of the present invention, will become readily apparent to those skilled in the art from the following detailed description of a preferred embodiment when considered in the light of the accompanying drawing in which.

DETAILED DESCRIPTION OF A PREFERRED EMBODIMENT

Figure 1:
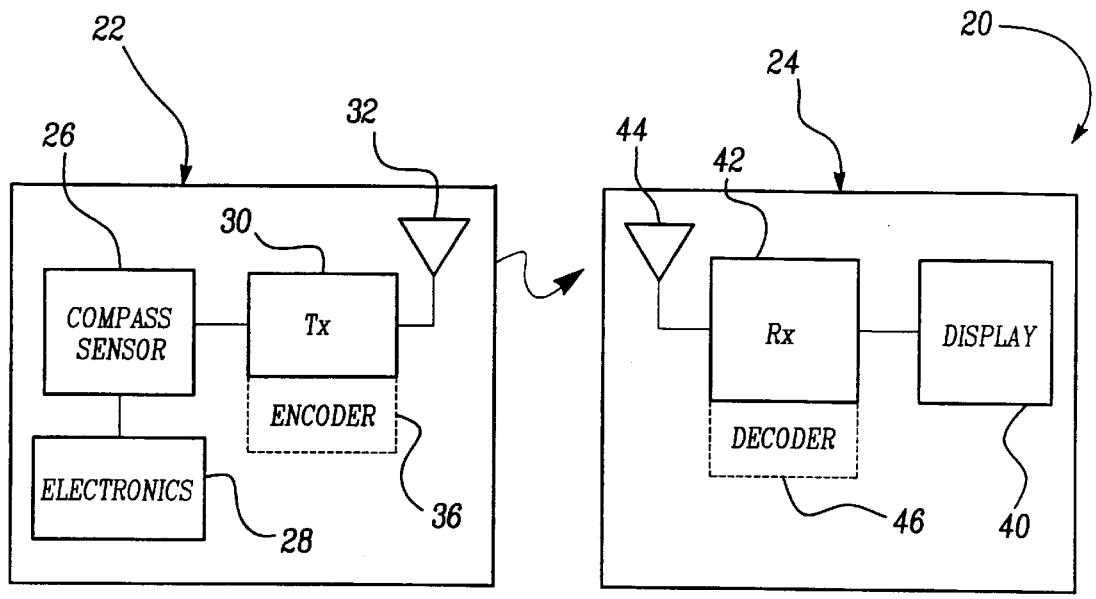
FIG. 1 is a schematic of a wireless compass system of the present invention.

A wireless compass system 20 generally includes a sensor module 22 and a display module 24. The sensor module 22 includes a compass sensor 26, such as a flux gate, suspended magnetized needle, or magnetometer, or other geographic directional sensors. The sensor 26 may optionally include electronics 28 for compensating for surrounding magnetic anomalies and magnetic influences, if necessary; however, as will be described below, many of these magnetic anomalies and influences can be reduced or avoided by the present invention, depending upon the vehicle in which it is installed. The sensor 26 is connected to a transmitter 30, such as an RF, microwave, infared, or acoustic transmitter, along with an appropriate antenna 32. Optionally, the transmitter 30 may include encoding circuitry and/or software 36 for encoding the transmitted signal.

The display module 24 includes a display 40 for displaying a geographic direction. The display 40 may be a display such as is typically used in vehicle compasses, such as an LED, LCD, or a high resolution display. The display 40 receives a signal indicating geographic direction from a wireless receiver 42 complementary to the transmitter 40 of the sensor module 22 and having an appropriate antenna 44. Optionally, the receiver 42 would include decoding circuitry and/or software 46 if necessary to decode the signal from the transmitter 30.

Figure 2:
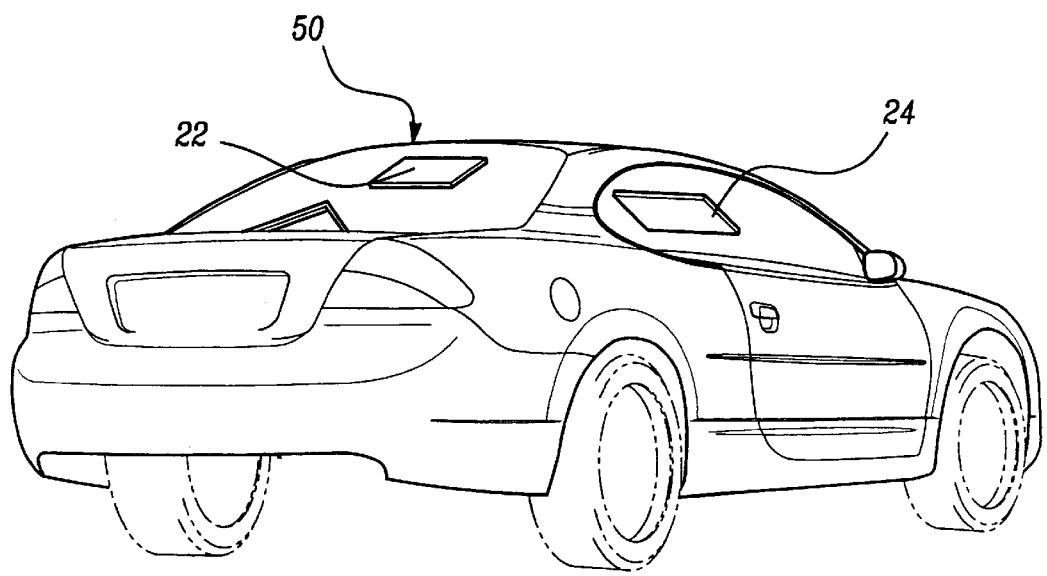
FIG. 2 illustrates the wireless compass system of FIG. 1 installed in the vehicle.

Referring to FIGS. 1 and 2, the sensor module 22 is installed in a first location in a vehicle 50, such as the vehicle's rear deck, as shown in FIG. 2. Alternatively, the sensor module 22 could be installed on the back window, on the windshield, or other locations of low magnetic anomalies and influences. It should be recognized that the ideal location would depend upon the particular vehicle 50 into which the compass system 20 is installed. The compass system 20 of the present invention permits the sensor module 22 to be easily installed in the first location, which is of relatively low magnetic anomalies and influences. At the same time, the display module 24 can easily be displayed in a second location in the vehicle 50 which is convenient for displaying to the driver, independent of the magnetic anomalies or influences at the second location. As shown in FIG. 2, the display module 24 may be installed on the windshield. Alternatively, the display module 24 could be installed in a headliner, dashboard, or in the rearview mirror. Again, the display module 24 can easily be installed at the second location which is most convenient for the driver, without regard for the magnetic anomalies and influences at the second location.

In operation, the sensor 26 determines the geographic orientation of the vehicle 50, generally according to known techniques. The sensor 26 generates a signal indicating the geographic heading of the vehicle 50 which is sent to the transmitter 30. The transmitter 30, via antenna 32, transmits a wireless signal indicating the geographic heading of the vehicle 50. The receiver 42 receives the wireless signal indicating geographic heading of the vehicle 50 via antenna 44 and indicates the geographic heading to the display 40. The display 40 then displays to the driver the current geographic heading of the vehicle 50.

Optionally, the signal can be encoded by the encoding circuitry and/or software 36 and subsequently decoded by the decoding circuitry and/or software 46 in the display module 24. This would help prevent interference between signals from adjacent vehicles.

The compass system 20 of the present invention provides a compass sensor 26 which can be easily installed at an ideal location which is lowest in magnetic anomalies and influences in order to provide the most accurate indication of vehicle heading. At the same time, the display 40 can be installed easily in a location which is most convenient for the driver, without regard to magnetic anomalies and influences.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A wireless compass comprising:
   a sensor determining a geographic orientation;
   a wireless transmitter transmitting a wireless signal indicating said geographic orientation as determined by said sensor;
   a receiver receiving said wireless signal; and
   a display connected to said receiver displaying said geographic orientation.

2. The wireless compass of claim 1, wherein said transmitter is an RF transmitter.

3. The wireless compass of claim 1, wherein said transmitter includes an encoder and said receiver includes a decoder.

4. The wireless compass of claim 1, wherein said compass sensor includes a fluxgate.

5. A wireless compass system in a vehicle comprising:
   a compass sensor installed in a first location of relatively low magnetic influence, said compass sensor determining a geographic direction;
   a wireless transmitter connected to said compass sensor and transmitting a wireless signal indicating said geographic direction as determined by said compass sensor;
   a receiver installed at a second location, different from said first location, said receiver receiving said wireless signal; and
   a display connected to said receiver and displaying said geographic direction based upon said wireless signal.

6. The wireless compass system of claim 5, wherein said second location has substantially more magnetic influences.

7. The wireless compass system of claim 5, wherein said transmitter is an RF transmitter.

8. The wireless compass system of claim 5, wherein said transmitter includes an encoder and said receiver includes a decoder.

9. The wireless compass system of claim 5, wherein said compass sensor includes a fluxgate.

10. A method for indicating a heading of a vehicle including the steps of:
    a) determining a geographic orientation of the vehicle;
    b) generating a signal indicative of the geographic direction;
    c) transmitting the signal via a wireless link;
    d) receiving the signal; and
    e) displaying the geographic direction based upon receiving the signal.

11. The method of claim 10, wherein the signal is sent from a first location to a second location adjacent a display.

12. The method of claim 10, further including the step of installing a sensor in a first location in a vehicle of relatively low magnetic influences.

13. The method of claim 12, further including the step of:
    installing a display in a second location in the vehicle, different from the first location, said step e) displaying on the display.

14. The method of claim 13, further including the step of:
    sending a wireless signal from the first location to the second location in said step c).

* * * * *